No. 846,632. PATENTED MAR. 12, 1907.
G. W. TICE.
GRAIN SHOCKER.
APPLICATION FILED OCT. 5, 1905.

Witnesses
Inventor.

UNITED STATES PATENT OFFICE.

GEORGE W. TICE, OF RILEY CENTER, MICHIGAN, ASSIGNOR OF ONE-HALF TO ALLEN K. TICE, OF LARIMORE, NORTH DAKOTA.

GRAIN-SHOCKER.

No. 846,632.     Specification of Letters Patent.     Patented March 12, 1907.

Application filed October 5, 1905. Serial No. 281,433.

*To all whom it may concern:*

Be it known that I, GEORGE W. TICE, a citizen of the United States, residing at Riley Center, county of St. Clair, State of Michigan, have invented certain new and useful Improvements in Grain-Shockers; and I do hereby declare the following to be a full, clear, and exact description of the invention, such as will enable others skilled in the art to which it appertains to make and use the same.

This invention relates to means for receiving sheaves of grain from a binder and forming them into shocks, after which the shocks are deposited in a vertical position butt-end upon the ground.

It is an object of the invention to provide apparatus of the character described which shall be operated from contact with the ground. By this means the imposition of the shocker apparatus as an additional burden upon the mechanism of the binder is avoided and the connections are much simplified, and at the same time the operator is relieved of the necessity for operating the shocker by main strength.

A further object of the invention is to provide means for spreading the bases of the shocks, so that the shocks will stand firmly.

Other objects will appear hereinafter.

In the accompanying drawings, which illustrate an embodiment of the invention.

Figure 1:
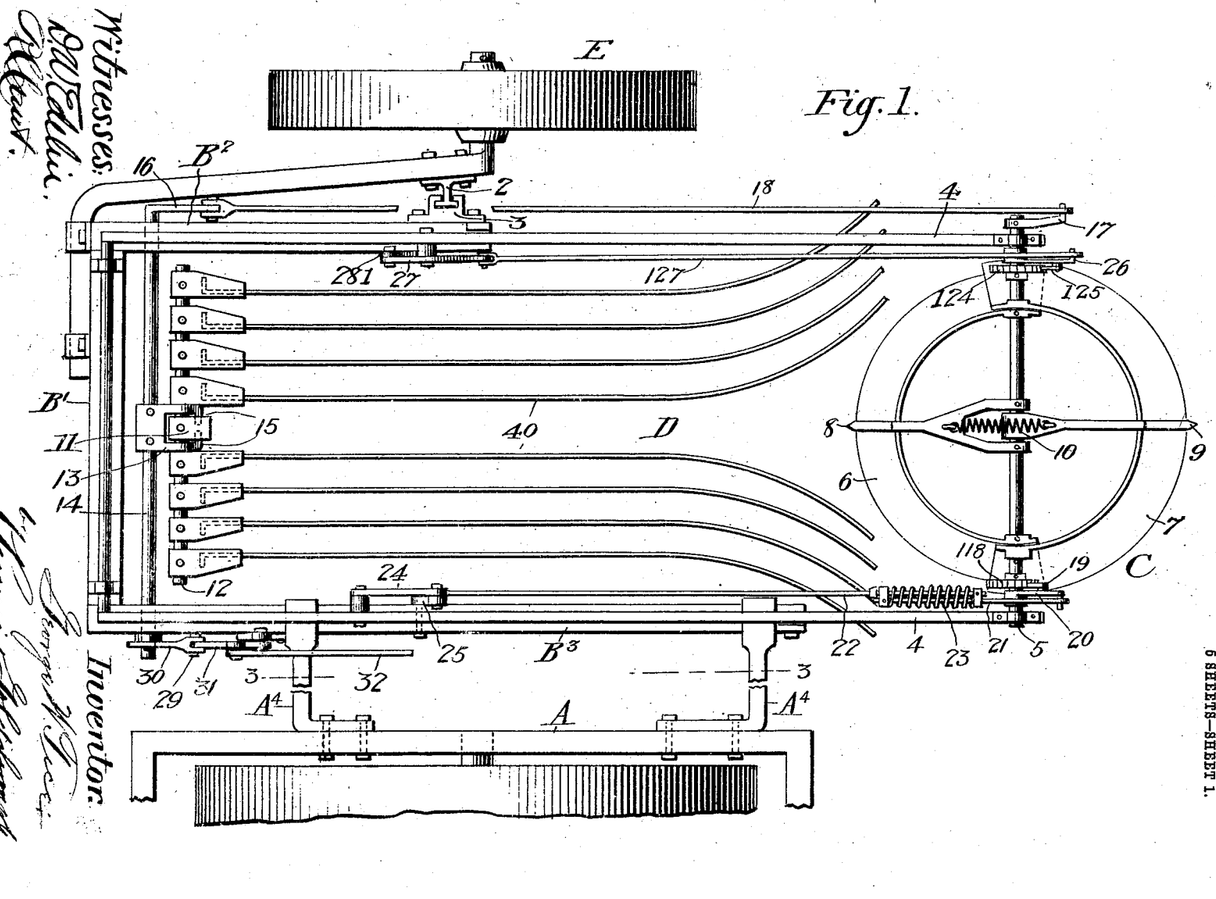
Figure 1 is a plan of the shocker with so much of a binder as is necessary to show the attachment of the shocker thereto, the shock-former being shown in vertical position, in which position the shock is deposited upon the ground.

Referring to the drawing, it will be seen that the shocker has a horizontally-disposed rectangular three-sided frame composed of the front cross-bar B', an inner side bar $B^3$, and an outer side bar $B^2$. This frame is rigidly secured to the frame A of the harvester by means of brackets $A^4$, projecting stubbleward from the harvester-frame and secured to the inner side bar $B^3$, so that the inner side of the shocker is supported by the harvester-frame. The outer side bar $B^2$ of the shocker-frame is shorter than the inner one, extending rearward from the front cross-bar to a point about abreast of the axle of the main supporting-wheel of the harvester, as shown in Fig. 1. There is no cross-bar at the rear end of the shocker-frame; but this end of the frame is left open for a purpose which will be apparent from the following description.

The outer side of the shocker is supported by a wheel E, which is carried up a radius-bar that is hinged to the cross-bar B' and extends rearward along the outer side bar of the shocker and has at its rear end a T-shaped projection 2, which is adjustable vertically in a guide 3, that is secured to the outer side bar $B^2$ at its rear end, so that the axle of the wheel E will be approximately in the same vertical plane as the axle of the harvester-supporting wheel, so as not to interfere with the turning or tilting of the harvester.

Figure 4:
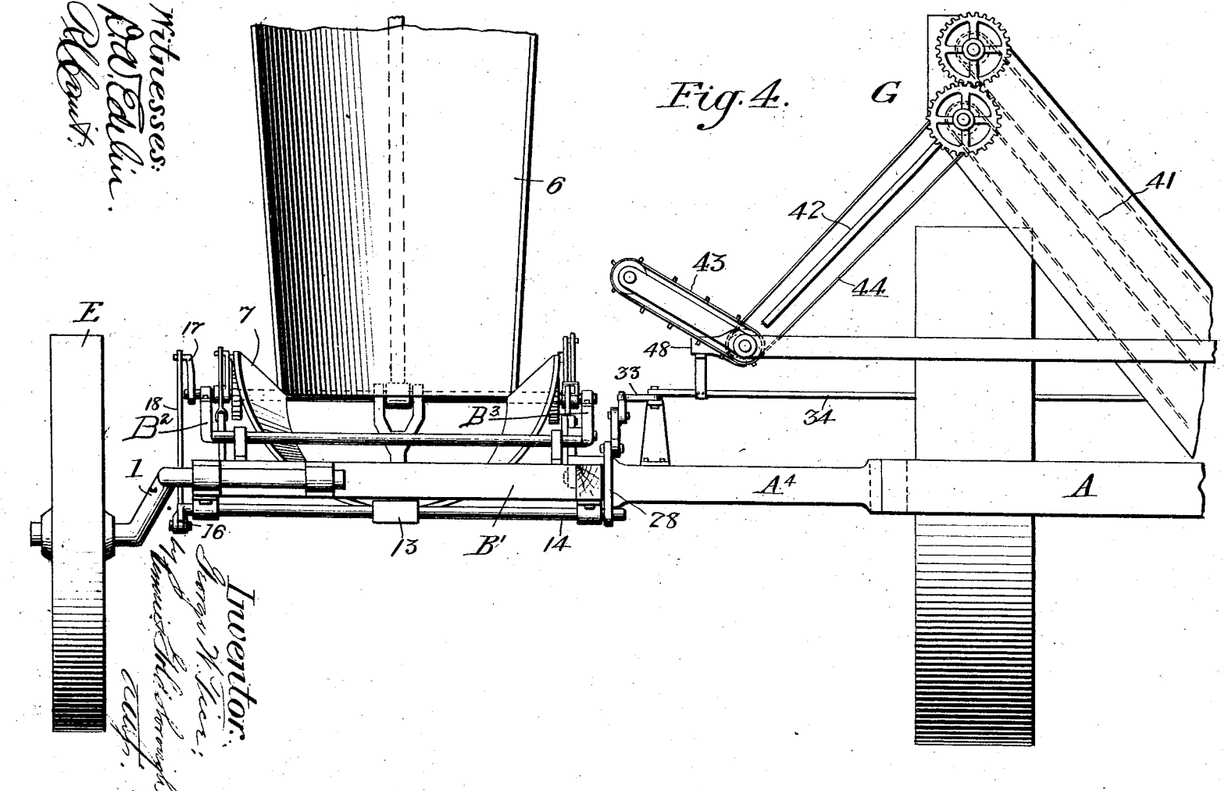
Fig. 4 is a front elevation of the shocker and a portion of the binder, in which is shown the means for transferring the sheaves from the binder to the shocker, the shock-former being shown in its receiving position.
Figure 5:
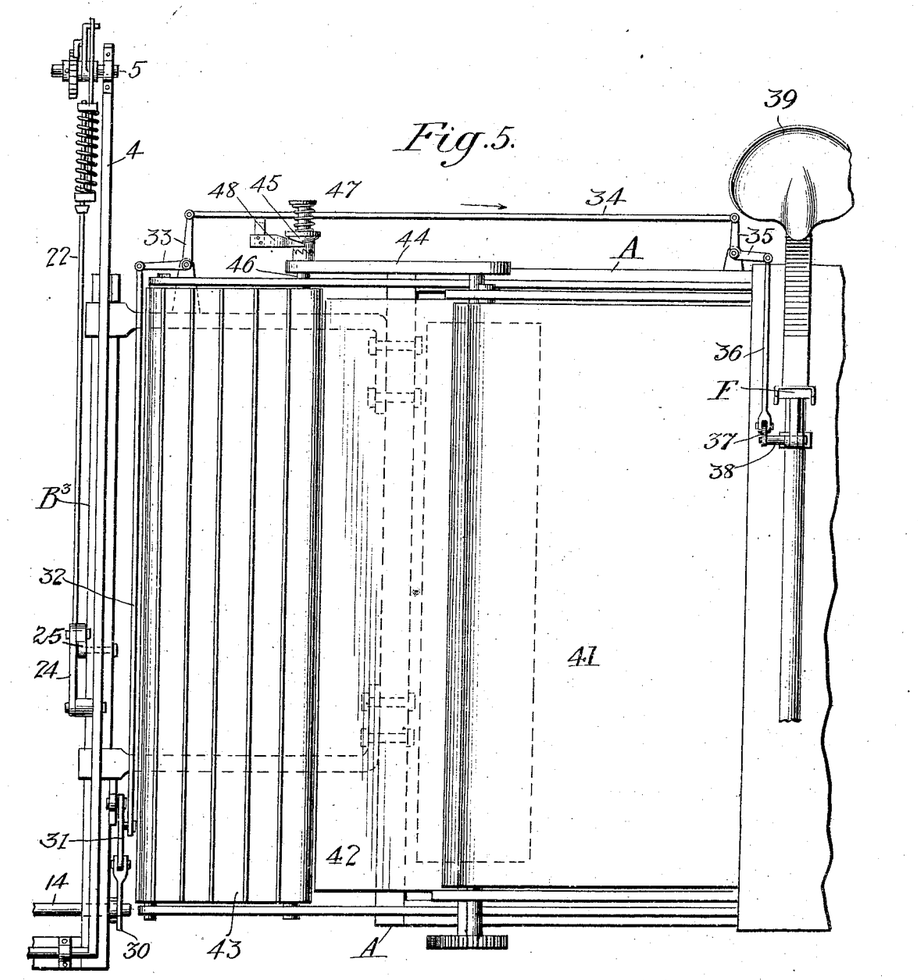
Fig. 5 is a plan view of adjacent portions of the shocker and binder, in which is shown the means for transferring the sheaves from the shocker to the binder and also the means for controlling the operation of the apparatus.

The shocker comprises a combined bundle-receiver and shock-former C, a spreader D for the purpose of opening out and supporting the butts of the bundles, so that the shock will have a wide base to stand on when deposited on the ground, and certain operating mechanism that will be described later on. The receiver and former is composed of two parts or sections 6 and 7, that are semicylindrical in shape and are hinged together, so as to make when closed a former or shaper of the elongated frusto-conical form shown in Fig. 2. The two parts are connected together at their rear ends by a shaft 5, to which the section 6 is fixed and upon which the section 7 is rotatively mounted. The shaft 5 is journaled in the rear ends of a pair of arms 4, that are pivoted at their front ends to the cross-bar B' of the shocker-frame, and the shock-former is sectioned on a plane passing approximately through the axis of the shaft. The sections preferably overlap each other when closed, especially at their wider ends, and a spring 10 is connected to the rear ends of the sections on opposite sides of the shaft 5, so as to hold them normally apart and in the position shown in Figs. 3 and 4. Normally the sections occupy the position indicated in these figures, where the section 7, which is the receiving-section, lies horizontally and forms a semicylindrical cradle into which the bundles are received from the binder. The section 6 is the shaping or forming section and serves more especially when closed against the section 7 to press the tops of the bundles into one common center, so as to give the shock a conical shape when deposited upon the ground. It stands in a vertical position until a sufficient number of bundles has been received by the section 7 to form a shock, when it is closed down upon the other section by the driver, who also releases a latch, that will presently be described, and allows the front ends of the two sections to fall to the ground, when the forward motion of the machine will cause the parts to operate in the manner hereinafter described. This movement of the shock-former is under the control of the driver of the harvester from his seat 39 through the intermediacy of a foot-lever F and intermediate link-and-lever connections 32, 33, 34, 35, 36, 37, and 38 between the foot-lever and a bell-crank lever 31, that is pivoted to the inner side bar B³ of the shocker-frame near its front end, as best shown in Figs. 1 and 5. The shocker is not connected in any way to the operative parts of the harvester; but its moving parts are all actuated by the front end of the receiver and former coming in contact with the ground, as above described, under the control of the above lever-and-link arrangement.

As will be understood from the drawings, the position of the shocker at the side of the harvester is such that the bundles as they come from the binder will fall into the receiver. This position is best shown in Figs. 4 and 5, where G denotes the harvester-elevator, 41 and 42, respectively, denote the elevator-belt and the binder-platform, and 43 indicates a discharging-belt that may or may not be employed for transferring the bundles as they are bound from the binder to the receiver of the shocker. This belt preferably extends the entire width of the binder and is operated from one of the upper rollers of the harvester-elevator by a driving-belt 44, running over the loose member of a clutch 45 on the inner shaft 46.

It will be obvious that while the shocker is in the act of depositing its load it is not in condition to receive other bundles from the binder, and the link 34, forming part of the connections by means of which the driver lets the front end of the shocker fall to the ground, is provided with a cam 48, which engages the splined member of the clutch 45 when the driver operates the rod in the direction of the arrow in Fig. 5. This disengages the two parts of the clutch, and the movement of the discharge-belt 43 will cease and remain stationary until the shocker has been restored to receiving position by the movement of the rod 34 in the opposite direction, when the spring 47 will cause the splined member of the clutch 45 to again lock the loose member to the inner shaft of the discharge-belt. While the belt 43 is stationary the bundles coming from the binder are piled up on it in the order of binding, and when the shaft 14 is rocked to bring the latch 11 up into position to hold the receiving-section of the shocker the belt will be again started by the means above described, and the accumulated bundles are deposited in the receiving-section of the shocker, which, it will be understood, comes into position just before the clutch 45 is operated to start the belt.

Figure 3:
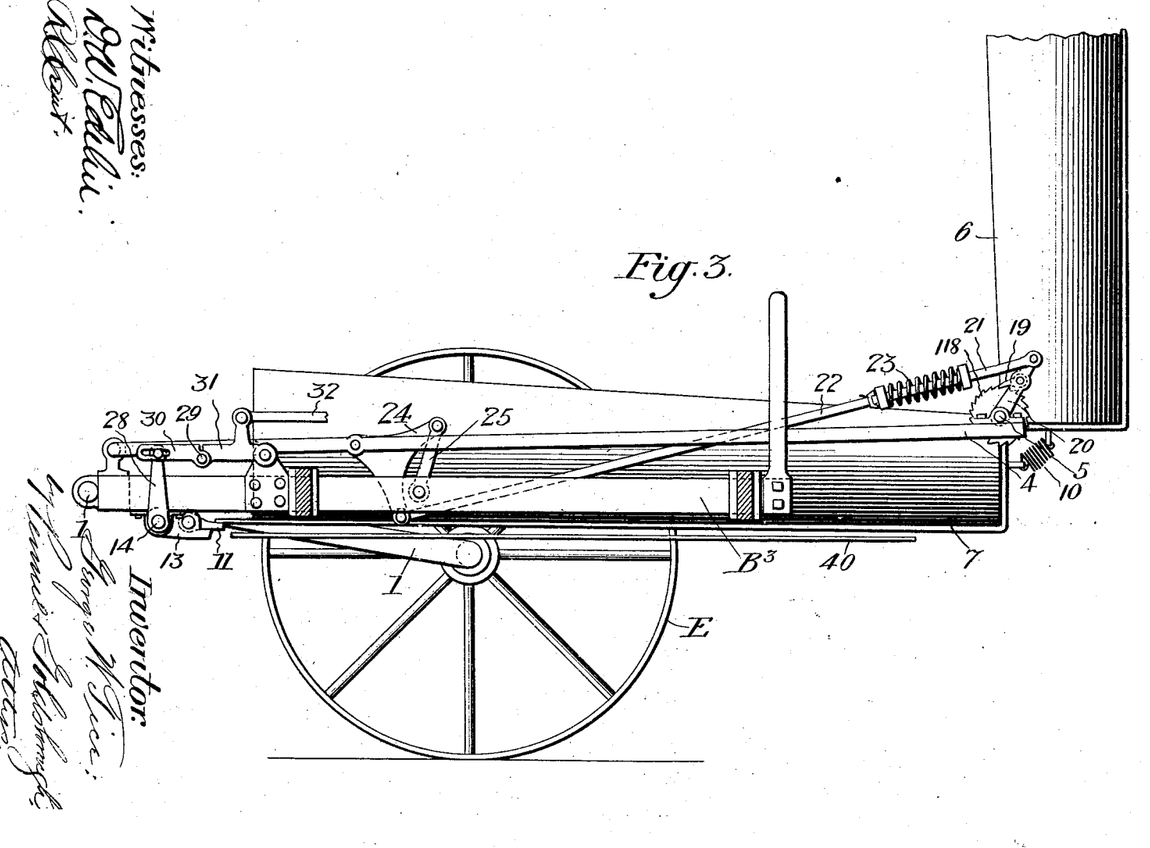
Fig. 3 is a sectional elevation on the line 3 3 of Fig. 1, the shocker being shown as in receiving position.

The rear end of the receiver and former and its shaft 5 are supported by the arms 4, already referred to, and the front end is supported with the section 7 in receiving position by means of a releasable latch 11, over which a projection 9, with which the end of this section is preferably provided, catches, as shown in Fig. 3. The latch 11 is fixed upon a shaft 12, which is journaled in an arm 13, rigidly secured to and projecting rearward from a shaft 14, that is journaled in bearings on the under side of the two side bars of the shocker-frame and has an upstanding crank-arm 28 on its inner end. This crank-arm is connected to the bell-crank lever 31, heretofore described, through the intermediacy of a slotted link 30, which has a ruled-joint connection 29 with one arm of the bell-crank lever, as best shown in Figs. 1 and 3. The shaft 14 is held in position with the arm 13 projecting horizontally rearward, so as to hold the latch 11 in position to support the front end of the receiving-section of the shock-former C, by means of the lock formed by the connection of the crank-arm 28 on the shaft with the bell-crank lever 31 through the slotted link 30 and the rule-joint 29.

Assuming all the parts to be in the position shown in Fig. 3 and the driver desiring to deposit a shock upon the ground, the above-described lock holding the shaft 14 in the position explained is broken by the driver pressing his foot upon the lever F and pulling the link 32 rearwardly, so as to rock the bell-crank 31 and permit the weight of the receiving-section 7, bearing upon the latch 11 to rock the shaft 14, so as to withdraw the latch and allow the front of the receiving-section 7 to fall to the ground, the entire shock former and receiver swinging on the shaft 5 as a center. Simultaneously with this movement the shaft 5, to which the forming-section 6 of the shocker is secured, is rocked by means of the crank 16 upon the shaft 14 pulling downwardly upon the rod 18 and the crank 17 on the outer end of the shaft, thus quickly closing the forming-section down upon the receiving-section 7, and as the latter section falls to the ground (carrying with it, of course, the section 6) the pressure of the forming-section upon the bundles will be increased by the following means: Upon the shaft 5 is a ratchet 118, which is engaged by a pawl 19, pivotally mounted upon a crank 20, that is free to turn upon the shaft. To the outer end of the crank is attached a short rod 21, which is connected to a pitman 22 by a spring 23, reacting between collars on the ends of the rod and the pitman. The forward end of the rod is connected to the lower arm of a floating bell-crank lever 24, that is pivoted to the inner arm 4 and has its other arm connected by a link 25 to a fixed pivot on the inner side of bar B³ of the shocker-frame. It follows from this construction that as the arm 4 rises the bell-crank 24 will be rocked upon the link 25 as a pivot, and its lower arm will pull forwardly on the pitman 22, and the shaft will be further turned by the ratchet and pawl 19 20, thereby increasing the pressure of the two parts of the shocker upon the bundles until the shocker has reached an upright position and the complete shock has been deposited upon the ground.

Figure 2:
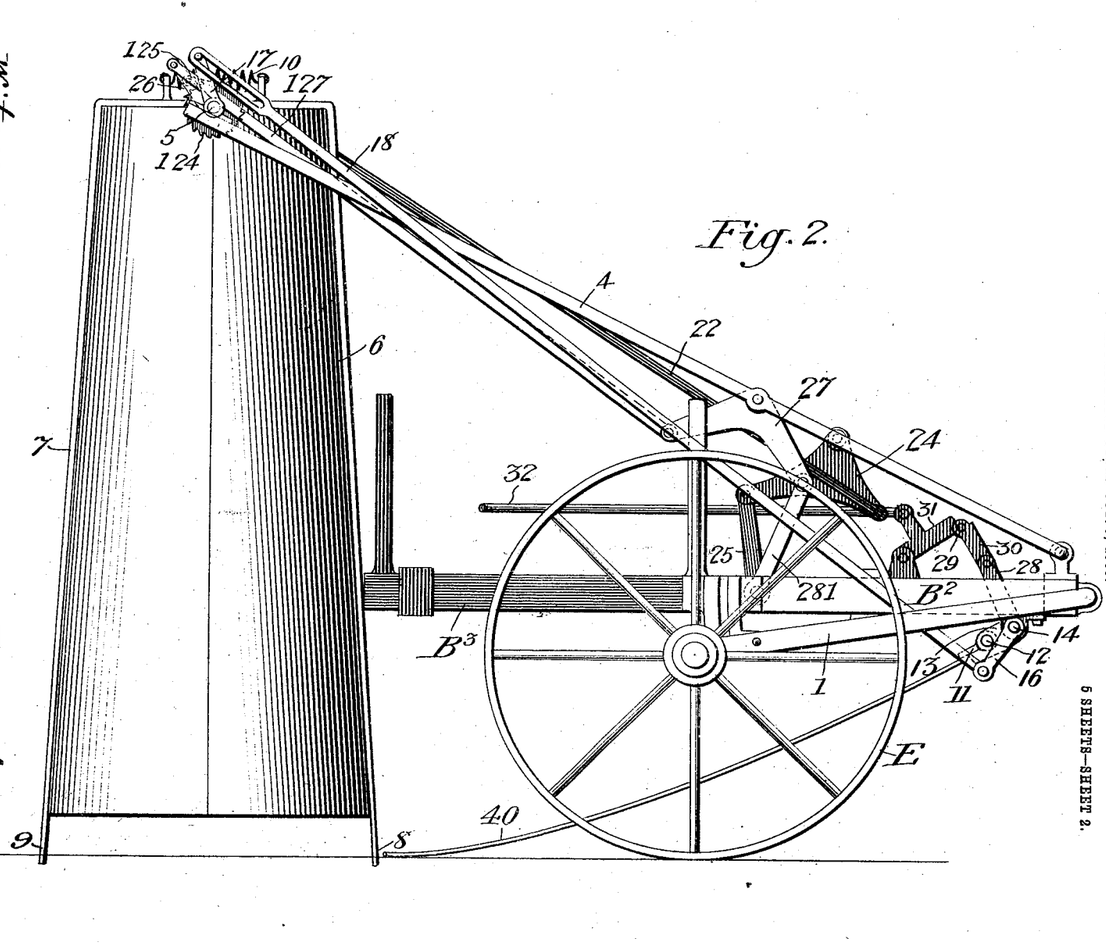
Fig. 2 is a side elevation of the apparatus shown in Fig. 1 looking from the stubble side.

When the shock-former has reached the vertical position shown in Fig. 2, the projection 8, with which the lower end of the section 6 is preferably provided, will come in contact with the ground, and as the machine passes on the receiving-section 7 (which, it will be remembered, is free to revolve upon the shaft 5) will pass out of contact therewith. The spring 10 will then operate to lift the receiving-section, turning upon the shaft 5 as a center, so that it will slide over the top of the shock as the machine continues its forward movement. Shortly after this the section 6 will also become disengaged from the ground, and the shocker having now become entirely disengaged from the shock it is necessary that its two parts be restored to the position shown in Fig. 3. To accomplish this, the receiving-section 7, which is in a nearly-vertical position, is pulled over forwardly by the spring 10 and falls into its receiving position, with the projection 9 resting upon the latch 11, already described. The section 6 is moved rearwardly and upwardly into the position shown in Fig. 3 by the following means: The ratchet-wheel 124 is fixed upon the outer end of the shaft 5 and is engaged by a pawl 125 on a crank 26, which is free to turn on the shaft. The teeth of the ratchet-wheel are engaged by the pawl when the latter moves forwardly, and this forward motion occurs when the arms 4, in which the shaft 5 is journaled, descend by means of a second floating bell-crank lever 27, which is pivoted to the outer arm 4 and has its forward end connected to the pawl-carrying crank 26 by means of a pitman 127. The other end of the bell-crank lever 27 is connected by a link 281 to a fixed pivot on the outer side bar B² of the shocker-frame. It results from this construction that as the receiving-section of the shocker slides off from the top of the shock and the arms which support the shaft 5 begin to fall the bell-crank 27 will pull forwardly on the pitman 127, and the revolution of the shaft 5, carrying the section 6 with it, will be continued by the engagement of the pawl 125 with the ratchet-wheel 26 until the arms 4 are in their lowest position, at which time the forming-section will be in a vertical position. (Shown in Fig. 3.)

When the arms 4 are raised, (by the receiving-section 7 of the shocker passing from the horizontal position shown in Fig. 3 to the vertical position shown in Fig. 2,) the bell-crank 27 on the outer arm 4 pushes the pitman 127 rearwardly, and the pawl 125 slides over the teeth of the ratchet-wheel 124. During this movement of the parts at the outer side of the shocker the bell-crank lever 24, which is pivoted to the inner arm 4, pulls forwardly on the pawl-carrying arm 20 and causes the forming-section 6 to be clamped down upon the bundles in the receiving-section and to press firmly thereupon, as already described. When the arms 4 fall by reason of the section 6 becoming disengaged from the ground, the bell-crank 27 upon the outer arm pulls forwardly upon the pawl-carrying arm 26 and continues the rotation of the shaft 5 through the intermediacy of the ratchet-wheel 124. During the described movement of the receiving-section 7 the crank 17 on the outer end of the shaft 5 will be turned through approximately one hundred and eighty degrees, and in so turning the pin on the crank first moves forwardly in the slot in the end of the pitman 18 and then rearwardly. In its rearward movement the pin comes against the end of the slot and forces the pitman 18 to the rear, thereby raising the crank 16 on the outer end of the shaft 14 and restoring the latch 11 into position to receive and support the front end of the section 7. It also turns rearwardly the crank 28 on the inner end of the shaft 14 and rocks the bell-crank lever 31 forwardly, so as to straighten the rule-joint 29 and lock the knuckle in position to prevent the shaft 14 from being turned by the weight of the bundles in the receiving-section.

In order that the shock may stand firmly in an upright position after it has been deposited upon the ground, it is desirable that the base of the bundles should be spread out laterally, so as to give the shock as wide a base of support as possible. This is provided for by the spreader D, referred to in the first part of this specification. This spreader consists of a series of rearwardly-extending spring teeth or fingers 40, secured to a rod 12, that is carried by an arm 13, projecting rearward from the shaft 14. One half of the fingers are bent outwardly and the other half are bent inwardly, as shown in Fig. 1. In the normal position of the spreader the fingers are held horizontally closed up under the receiving-section 7 of the shock. When shaft 14 is locked to trip the latch 11 and allow the receiving-section to fall, the rod 12 is lowered, so that the spreader teeth or fingers for the main portion of their length rest upon the ground. This lowering of the spreader occurs simultaneously with the falling of the front end of the receiving-section 7, and when this section straightens up the forward motion of the machine draws the spreader fingers or teeth through the butts of the bundles, thereby spreading them out laterally before they get firmly seated on the ground, thus giving the shock a wide base. After the shock has been deposited the return of the shaft 14 to normal position restores the spreader into its horizontal position immediately under the receiving-section.

While it is thought that the function and operation of the various parts of the device as a whole have been sufficiently explained in the foregoing description, it may, however, be advantageous to briefly review them. The receiving-section 7 of the shocker being in position to receive the bundles from the binder, as shown in Figs. 3 and 4, they will be discharged into the receiver by the belt 43, as before described. Upon a sufficient number of bundles having accumulated in the receiver to form a shock the driver presses his foot upon the lever F. This results in rocking the shaft 14 and the consequent dropping of the arm 13, so that the forward end of the section 7 of the shocker is released from the latch 11 and falls to the ground. The rocking of the shaft 14 depresses the rod 12, to which the spreader-fingers 40 are secured at their forward ends, and these fingers are thus lowered, so that they rest upon the ground for the greater portion of their length. The rocking of the shaft 14 also throws down the crank 16 and, by means of the link 18 and the crank 17, rocks the shaft 5 and closes the forming-section of the shocker down upon the receiving-section 7. The action of the driver in allowing the receiving-section of the shocker to fall also results in the disengagement of the members of the clutch through which the discharge-belt 43 is driven, and the discharge of bundles into the shocker thereupon ceases until the section 7 is again restored to receiving position. The forward movement of the machine operates to bring the combined receiver and former, with its two sections, close together into the upright position, (shown in Fig. 2,) and during this movement the spreader-teeth 40 are drawn through the base of the shock, thereby spreading the bundles laterally. As the receiver and former turn from the horizontal to the vertical position the pressure exerted by the sections upon the inclosed shafts is increased, particularly at the top, so that the shock is given a conical formation. When the shock-former has reached an approximately vertical position, the section 7, which is at this time behind the shock, is disengaged from the ground and moves upward backwardly, so that it will pass over the top of the shock as the machine continues to advance. This further movement of the machine also results in disengaging the section 6 of the shock-former from the ground, and it then moves forwardly and upwardly to the position shown in Figs. 3 and 4, the arms and the shaft 5, to which this section is secured, falling into the position shown in Fig. 3. This lowering of the arms and shaft is aided by the tension of the spring 23, and the falling of the arms further results in straightening out the knuckle-joint 29, 30, and 31 into its locking position and throwing into engagement the members of the clutch 45. The receiving-section 7 of the shocker having meantime returned to the normal position to receive the bundles and the discharge-belt 43 having been started up, the bundles will be removed from the binder-deck 42 in the order in which they were deposited upon the belt by the binder and will be successively deposited within the shocker. The cycle of operations above described may then again be started by the pressure of the driver's foot upon the lever F.

What I claim is—

1. The combination with a shock-former, of a traveling support therefor to which said former is rotatably connected, the said former being adapted when released to engage with the ground and be turned about its pivot thereby, and releasable means for holding said former out of contact with the ground.

2. The combination with a shock-former, of a frame, an axle supporting one end of said former, and releasable means supporting the other end of said former, the said former being adapted when released to engage with the ground and be turned upon its pivot thereby.

3. The combination with a shock-former comprising a plurality of sections, of a traveling support therefor to which said former is rotatably connected, the said former being adapted when released to engage with the ground and be turned upon its pivot thereby, releasable means for holding said former out of contact with the ground, and means for removing one of said sections from the rear of the shock when said former has reached an approximately upright position.

4. The combination with a shock-former, of a support therefor to which said former is rotatably connected, the said former being adapted to move from receiving to discharging position, and means for completing a revolution of said former for each discharge.

5. The combination with the shock-former, of a traveling support therefor to which said former is rotatably connected, the said former being adapted to engage with the ground and be turned upon its pivot thereby, releasable means for holding said former out of contact with the ground and means for returning said former to receiving position.

6. The combination with the shock-former, of a traveling support therefor to which said former is rotatably connected, the said former being engageable with the ground and rotatable thereby, said former having a plurality of sections, and means placed under stress by the rotation of said former for pressing the said sections toward each other.

7. The combination of a movable shock-former comprising a plurality of sections, and means placed under stress by the movement of said former for pressing the said sections toward each other.

8. The combination with a shock-former comprising a plurality of sections, of a traveling support therefor to which said former is rotatably connected, the said former being adapted to engage with the ground and be rotated thereby, means for bringing the said sections together, and means placed under stress by the rotary movement of said former for further pressing the sections toward each other.

9. The combination with a shock-former, of a traveling support therefor to which said former is rotatably connected, the said former being adapted to engage with the ground and be rotated thereby into discharging position, and means placed in operable position by the rotary movement of said former for moving said former into receiving position.

10. The combination with a shock-former, of means for feeding sheaves to said former, and a common means for setting said former in operation to deposit a shock and removing the driving power from said feeding means.

11. The combination with a shock-former comprising a plurality of sections, of means for bringing said sections together, releasable means for maintaining said former in receiving position, means for feeding sheaves to said former, and a common means for cutting off the power from said feeding means, releasing said former-retaining means, and operating said means for bringing said sections together.

12. The combination with a frame, a bail pivotally secured thereto, a former rotatably secured to said bail, said former comprising a plurality of sections, and a tension device placed under stress by the movement of said bail away from said frame, said tension device being connected to said former and adapted to press the sections on said former together.

13. The combination with a frame, of a bail pivotally secured thereto, a shock-former having a plurality of sections rotatably secured to said bail, links between said frame and bail, and a tension device connected to said links and said former.

14. The combination with a frame, of a bail pivotally secured thereto, a shock-former rotatably secured to said bail, said former being adapted to turn from receiving to discharging position, and means for completing a revolution of said former placed in operative position by movement of said bail relative to said frame.

15. The combination with a frame, of a bail pivotally secured thereto, a shock-former rotatably secured to said bail, said former being adapted to turn from receiving to discharging position, links between said bail and frame, and means for completing a revolution of said former connected between said links and said former.

16. In combination with a traveling support, a shock-former rotatably connected thereto, and a series of rearwardly-extending rods mounted on the support under the former, said rods being divided into two sets, each curving outwardly at the rear from a central line, whereby, as the shocker rotates to dump the shock, the teeth will spread the base of the shock laterally.

17. The combination with the traveling support, of a shock-former mounted thereon to turn about an axis transverse to the direction of travel of the support, the said former comprising sections divided approximately along a plane passing longitudinally through the axis of rotation and said sections being individually rotatable about the axis of rotation of the former as a whole.

18. The combination with the traveling support, of a shock-former mounted thereon to turn about an axis transverse to the direction of travel of the support, the said former comprising sections divided approximately along a plane passing through the axis of rotation, and means tending to move one of the sections of said former away from the other.

19. In a grain-shocker, the combination with a traveling support, of a shaft extending transversely to the movement of said shocker over the field and rotatably mounted upon said support, a shock-former comprising a plurality of sections divided by a plane approximately through the axis of said shaft, one of said sections being rotatably mounted upon said shaft and the other section being fixed to said shaft, and a spring connected between said shock-former sections and tending to separate them.

20. The combination with a self-binding harvester, of a shocker-carrying frame pivoted transversely of the movement of the machine and free to rise at its rear end, a shocker rotatably mounted at its rear end on an axis substantially parallel to said axis of the frame, and a releasable latch for supporting the front end of the shocker.

21. The combination with a self-binding harvester, of a shocker-carrying frame pivoted transversely of the movement of the machine and free to rise at its rear end, a shocker rotatably mounted at its rear end on an axis substantially parallel to said axis of the frame, a releasable latch for supporting the front end of the shocker, a discharger for delivering the bundles from the binder into the shocker, and means whereby the driver may simultaneously release the latch and stop the discharger.

22. The combination with a self-binding harvester, of a shocker rotatably mounted at its rear end on an axis that is free to rise and fall vertically, said axis being transverse to the movement of the machine and a releasable latch for supporting the front end of the shocker.

In testimony whereof I affix my signature in presence of two witnesses.

GEORGE W. TICE.

Witnesses:
E. E. ARPIN,
E. M. PHILLIP.